US008494249B2

(12) United States Patent
Yonezawa et al.

(10) Patent No.: US 8,494,249 B2
(45) Date of Patent: Jul. 23, 2013

(54) PAPER SHEET RECOGNITION APPARATUS AND PAPER SHEET RECOGNITION METHOD

(75) Inventors: Toru Yonezawa, Hyogo (JP); Kazuhiro Ohmatsu, Hyogo (JP); Hirofumi Kameyama, Hyogo (JP)

(73) Assignee: Glory Ltd., Himeji-shi (JP)

( * ) Notice: Subject to any disclaimer, the term of this patent is extended or adjusted under 35 U.S.C. 154(b) by 538 days.

(21) Appl. No.: 12/676,052

(22) PCT Filed: Sep. 7, 2007

(86) PCT No.: PCT/JP2007/067533

§ 371 (c)(1), (2), (4) Date: Mar. 2, 2010

(87) PCT Pub. No.: WO2009/031242

PCT Pub. Date: Mar. 12, 2009

(65) Prior Publication Data

US 2010/0195918 A1 Aug. 5, 2010

(51) Int. Cl.
*G06K 9/00* (2006.01)

(52) U.S. Cl.
USPC .......................................... 382/135; 382/218

(58) Field of Classification Search
USPC ................................................. 382/218, 135
See application file for complete search history.

(56) References Cited

U.S. PATENT DOCUMENTS

| | | | | |
|---|---|---|---|---|
| 4,823,393 | A * | 4/1989 | Kawakami | 382/135 |
| 5,542,518 | A | 8/1996 | Kurosawa et al. | |
| 6,393,140 | B1 | 5/2002 | Itako | |
| 7,584,890 | B2 * | 9/2009 | Mazowiesky et al. | 235/454 |
| 2003/0179935 | A1 * | 9/2003 | Kubota | 382/199 |
| 2004/0247169 | A1 * | 12/2004 | Ross et al. | 382/137 |
| 2005/0213818 | A1 * | 9/2005 | Suzuki et al. | 382/190 |
| 2007/0031021 | A1 * | 2/2007 | Natori | 382/135 |

FOREIGN PATENT DOCUMENTS

| | | | |
|---|---|---|---|
| EP | 0 649 114 | A2 | 4/1995 |
| EP | 649114 | A2 * | 4/1995 |
| JP | 63-80682 (U) | | 5/1988 |
| JP | 7-320061 (A) | | 12/1995 |
| JP | 8-221632 (A) | | 8/1996 |
| JP | 2000-259894 | A | 9/2000 |
| JP | 2001-273541 (A) | | 10/2001 |
| JP | 4586865 | B2 | 9/2009 |
| JP | 2010-102653 | A | 5/2010 |
| JP | 2010-176601 | A | 8/2010 |
| WO | WO 95/23388 | A1 | 8/1995 |

* cited by examiner

*Primary Examiner* — John Strege
(74) *Attorney, Agent, or Firm* — Foley & Lardner LLP

(57) ABSTRACT

A paper sheet recognition apparatus recognizes a type of a paper sheet in an input image by matching the input image of the paper sheet with reference images of a plurality of paper sheets. The apparatus includes a candidate selecting unit that selects a predetermined number of candidate types of the paper sheet based on a density feature and direction features of each block acquired by uniformly dividing the input image and the reference images; and a detailed judgment unit that adaptively divides the input image into blocks according to features of a reference image corresponding to each type of paper sheets selected by the candidate selecting unit, and performs a detailed judgment based on matching values between corresponding blocks of the divided input image and each of the reference images.

7 Claims, 11 Drawing Sheets

PAPER SHEET RECOGNITION APPARATUS AND PAPER SHEET RECOGNITION METHOD

TECHNICAL FIELD

The present invention relates to a paper sheet recognition apparatus and a paper sheet recognition method for recognizing the type of paper sheets in an input image by matching the input image with reference images of a plurality of paper sheets, and, more particularly to a paper sheet recognition apparatus and a paper sheet recognition method capable of recognizing the type of paper sheet highly accurately and efficiently and at high speed, even if there are many types of paper sheets to be judged.

BACKGROUND ART

Conventionally, in ATM (Automatic Teller Machine) or the like at banks, when a banknote is received, the type thereof needs to be judged. Therefore, there has been known a paper sheet recognition technique for recognizing the type of paper sheets such as banknotes and securities highly accurately.

For example, Patent Document 1 discloses a paper sheet recognition method in which for each combination of two kinds of judgment candidates, an effective read position, at which a distance between distributions is largest between distributions of reference features of both of the judgment candidates, is extracted from a plurality of predetermined read positions. The distance from the feature of a paper sheet to be tested, which can be acquired only from the effective read position, is acquired respectively for a combination in which the distance between distributions at the effective read position acquired for each combination of the two kinds of judgment candidates is largest. A narrowing-down process is then performed for excluding the kind of paper sheet with the acquired distance being larger from the judgment candidate, and the kind of the paper sheet is judged by repeating the narrowing-down process for the remaining judgment candidates.

Patent Document 1: Japanese Patent Application Laid-open No. 2001-273541

DISCLOSURE OF INVENTION

Problem to be Solved by the Invention

However, in Patent Document 1, because the narrowing-down process for leaving one of the two judgment candidates is repeated, if a number N of paper sheets as judgment candidates increases, N−1 times of recognition processing needs to be repeated until one final candidate is left, so that there can be a problem of processing delay. For example, when the judgment candidates are limited to the banknotes circulated in Japan, there are only four kinds of denominations, these are 1,000-yen note, 2,000-yen note, 5,000-yen note, and 10,000-yen note. However, if foreign banknotes are included as recognition targets, the number of judgment candidates is considerably large, thereby causing the above-mentioned problem.

Therefore, it is conceivable to perform preprocessing of specifying judgment candidates to one by performing different processing beforehand, and to compare a judgment candidate specified by the preprocessing with a paper sheet to be judged, thereby performing a detailed judgment as to whether both are of the same kind.

However, when one judgment candidate is specified from a plurality of judgment candidates by such preprocessing, if the judgment candidate is judged to be that of a different kind from the paper sheet to be judged, this judgment candidate is excluded and the same processing needs to be repeated again. It is because a fine judgment is not always performed in the preprocessing of specifying a judgment candidate, and there can be a judgment error.

Particularly, when a banknote is the recognition target, only a part of the banknote, such as a watermarked part thereof, is often modified slightly as a countermeasure against counterfeiting. Therefore, if only one judgment candidate is specified by such preprocessing, the possibility of causing a judgment error cannot be eliminated as a result.

Considering these points, it is an important issue as to how to recognize the type of banknotes highly accurately and efficiently and at high speed, when there are many types of banknotes to be judged. There is the same issue in paper sheets other than banknotes, such as securities.

The present invention has been made in view of the above problems, and an object of the present invention is to provide a paper sheet recognition apparatus and a paper sheet recognition method that can recognize the type of paper sheets highly accurately and efficiently and at high speed, even if there are many types of paper sheets to be judged.

Means for Solving Problem

A paper sheet recognition apparatus according to an aspect of the present invention recognizes a type of a paper sheet in an input image by matching the input image of the paper sheet with reference images of a plurality of paper sheets. The apparatus includes a candidate selecting unit that selects a predetermined number of candidate types of the paper sheet based on a density feature and direction features of each block acquired by uniformly dividing the input image and the reference images; and a detailed judgment unit that adaptively divides the input image into blocks according to features of a reference image corresponding to each type of paper sheets selected by the candidate selecting unit, and performs a detailed judgment based on matching values between corresponding blocks of the divided input image and each of the reference images.

The paper sheet recognition apparatus according to the present invention may further include a feature storage unit that stores therein the features of the reference image for each type of the paper sheets. The candidate selecting unit includes may include a first block dividing unit that uniformly divides the input image into blocks at a time of receiving the input image; a density feature calculator that calculates a density feature of each block divided by the first block dividing unit; a direction feature calculator that calculates direction features of each block divided by the block dividing unit; and a selecting unit that selects the predetermined number of candidate types of the paper sheet based on the density feature of each block calculated by the density feature calculator, the direction features of each block calculated by the direction feature calculator, and the features of each of the reference images stored in the feature storage unit.

The paper sheet recognition apparatus according to the present invention may further include a memory that stores, for each type of the paper sheets, block division methods each corresponding to features of the reference image of each type of the paper sheets and divided reference images acquired by dividing the reference image into blocks according to the block division method. The detailed judgment unit may include a second block dividing unit that reads, from the memory, block division methods and divided reference images, which respectively correspond to the candidate types of the paper sheet selected by the candidate selecting unit, and divides the input image into blocks according to each of the block division methods; a detailed matching-value calculator that calculates, for each of the candidate types of the paper sheet, detailed matching values between corresponding blocks of the divided input image divided into blocks by the second block dividing unit and the divided reference images; and a specifying unit that specifies a type of the paper sheet corresponding to the input image based on respective detailed matching values calculated by the detailed matching-value calculator.

In the paper sheet recognition apparatus according to the present invention, the input image and the reference images may include an infrared reflection image, an infrared transmission image, a visible reflection image, and a visible transmission image acquired by imaging a same paper sheet, and the candidate selecting unit may temporarily narrow down types of the paper sheet by using a density feature and direction features of each block in the visible reflection image, and then sequentially narrow down the candidate types of the paper sheet by using the infrared transmission image, the infrared reflection image, and the visible transmission image of the temporarily narrowed down candidate types of paper sheet, to select the predetermined number of candidate types of the paper sheet from a plurality of paper sheets sheet types.

In the paper sheet recognition apparatus according to the present invention, the first block dividing unit may divide the input image uniformly into blocks of a same block size, even if sizes of respective paper sheets are different depending on the types of the paper sheets.

In the paper sheet recognition apparatus according to the present invention, the candidate selecting unit may further include a number-of-selections receiving unit that receives a command input for setting the number of candidate types of the paper sheet to be selected, and the selecting unit may select the set number of candidate types of the paper sheet.

A paper sheet recognition method according to another aspect of the present invention is for recognizing a type of a paper sheet in an input image by matching the input image of paper sheet with reference images of a plurality of paper sheets. The method includes a candidate selecting step of selecting a predetermined number of candidate types of the paper sheet based on a density feature and direction features of each block acquired by uniformly dividing the input image and the reference images; and a detailed judgment step of adaptively dividing the input image into blocks according to features of a reference image corresponding to each type of paper sheets selected at the candidate selecting step, and of performing a detailed judgment based on matching values between corresponding blocks of the divided input image and each of the reference images.

EFFECT OF THE INVENTION

According to the present invention, a predetermined number of candidate types of the paper sheet are selected based on a density feature and direction features of each block acquired by uniformly dividing an input image and a plurality of reference images into blocks, and the input image is adaptively divided into blocks according to the features of a reference image corresponding to each of the selected types of the paper sheet, to perform a detailed judgment based on matching values between blocks of the divided input images and blocks of each of the divided reference images. Accordingly, even if there are many types of paper sheets to be judged, the type of paper sheet can be recognized highly accurately and efficiently and at high speed.

According to the present invention, the features of the reference image is stored beforehand for each type of paper sheets, the input image is uniformly divided into blocks at the time of receiving the input image, a density feature and direction features of each of the divided blocks are calculated, and a predetermined number of candidate types of the paper sheet are selected based on the calculated density feature and direction features of each of the blocks and the features of each of the reference images stored beforehand. Accordingly, candidate types of the paper sheet can be selected efficiently by using the features of each reference image created beforehand by a unit other than a paper sheet recognition unit.

According to the present invention, the block division methods each corresponding to features of the reference image of each type of paper sheets and divided reference images acquired by dividing reference image into blocks according to the block division method are stored for each type of the paper sheets. The block division method respectively corresponding to the selected candidate types of the paper sheets and the divided reference images are read from the memory, and the input image is divided into blocks according to each of the read block division methods. Detailed matching values between the corresponding the input image divided into blocks and the divided reference images are calculated, for each candidate type of the paper sheet. The type of the paper sheet corresponding to the input image is then specified based on the calculated detailed matching values. Accordingly, because the detailed judgment needs only to be performed with respect to a predetermined number of candidate types of the paper sheet, the detailed judgment can be performed at high speed.

According to the present invention, the input image and the reference images include an infrared reflection image, an infrared transmission image, a visible reflection image, and a visible transmission image acquired by imaging a same paper sheet, and the candidate types of the paper sheet are temporarily narrowed down by using a density feature and direction features of each block in the visible reflection image, and then sequentially narrowed down by using the infrared transmission image, the infrared reflection image, and the visible transmission image of the temporarily narrowed down candidate types of the paper sheet, to select the predetermined number of candidate types of the paper sheet from a plurality of paper sheet types. Accordingly, higher speed and better efficiency in processing can be realized through stepwise narrowing down. Particularly, because the visible reflection image has the largest features in a judgment of type of the paper sheet, the processing can be performed at higher speed and more efficiently by using the visible reflection image for the first narrowing down.

According to the present invention, because an input image is uniformly divided into blocks of a same block size even if sizes of each paper sheet are different, the block size does not need to be changed for each paper sheet, thereby realizing high speed processing.

According to the present invention, a command input for setting the number of candidate types of the paper sheet to be selected is received, and the set number of candidate types of the paper sheet are then selected. Accordingly, processing depending on the needs of an operator can be performed, such that when there are many similar reference images or when it is desired to prevent an omission of candidate even if compromising a processing time, the number of selections may be increased, or when higher speed processing is desired, the number of selections may be reduced.

EXPLANATIONS OF LETTERS OR NUMERALS

Figure 1:
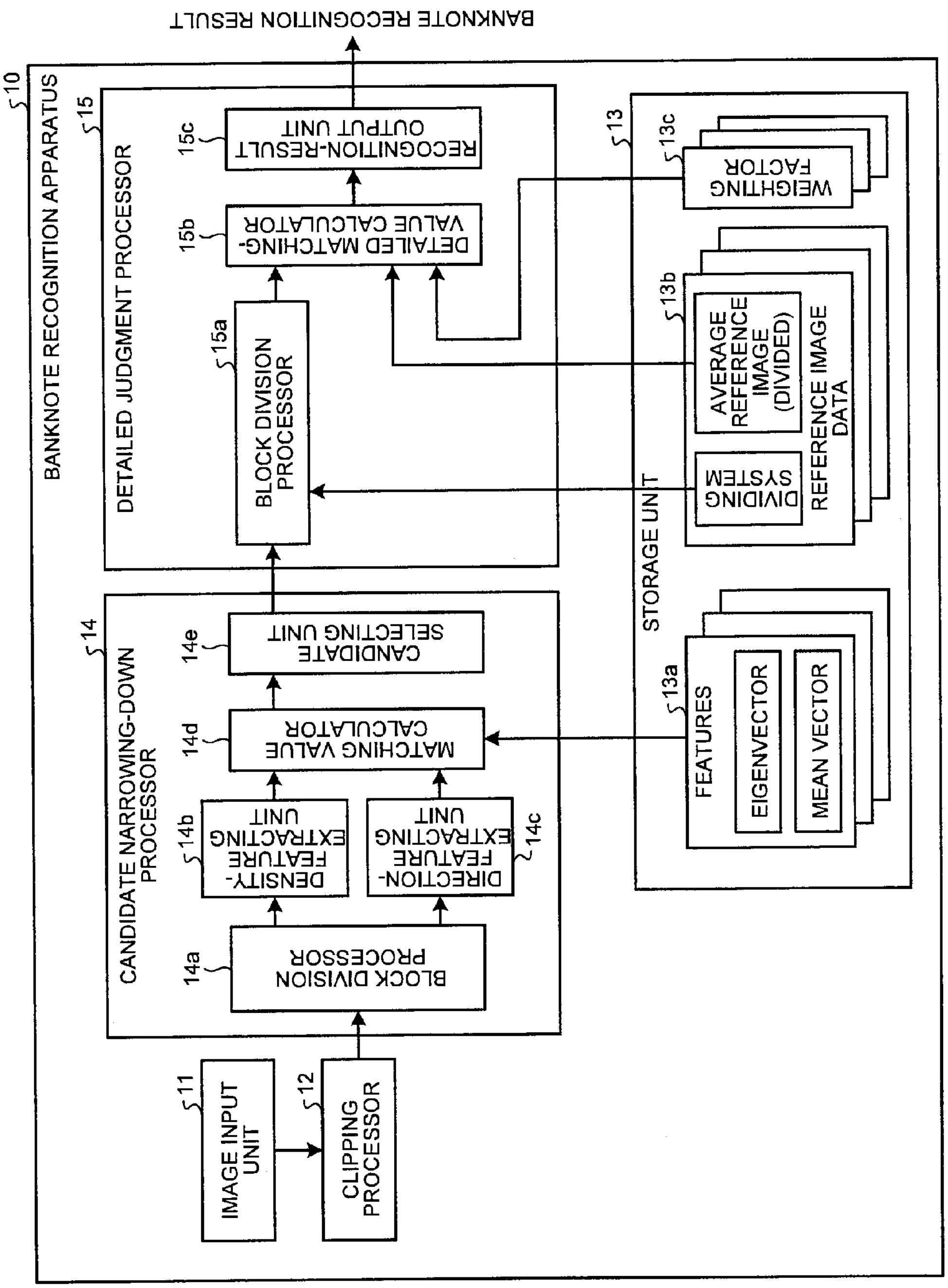
FIG. 1 is a functional block diagram of a configuration of a banknote recognition apparatus according to an embodiment of the present invention.

10 Banknote recognition apparatus
11 Image input unit
12 Clipping processor
13 Storage unit
13*a* Features
13*b* Reference image data
14 Candidate narrowing-down processor
14*a* Block division processor
14*b* Density-feature extracting unit
14*c* Direction-feature extracting unit
14*d* Matching value calculator
14*e* Candidate selecting unit
15 Detailed judgment processor
15*a* Block division processor
15*b* Detailed matching-value calculator
15*c* Recognition-result output unit
21 Infrared transmission image
22 Infrared reflection image
23 Visible transmission image
24 Visible reflection image
31 Infrared-transmission partial image
32 Infrared-reflection partial image
33 Visible-transmission partial image
34 Visible-reflection partial image

BEST MODE(S) FOR CARRYING OUT THE INVENTION

Exemplary embodiments of a paper sheet recognition apparatus and a paper sheet recognition method according to the present invention will be explained below in detail with reference to the accompanying drawings. In this explanation, it is assumed that the type of banknote is recognized as a recognition target, and features and the like of a reference image to be used at the time of recognizing the banknote are prepared beforehand and stored in a storage unit.

Embodiments

<Schematic Configuration of Banknote Recognition Apparatus>

A configuration of a banknote recognition apparatus 10 according to an embodiment of the present invention is explained first. FIG. 1 is a functional block diagram of a configuration of the banknote recognition apparatus 10 according to the present embodiment. The banknote recognition apparatus 10 shown in FIG. 1 stores features of each of the banknotes (an eigenvector and a mean vector) and reference image data (an average reference image and a division method) therein beforehand. When an input image is acquired, the banknote recognition apparatus 10 selects a predetermined number of types of banknotes from a plurality of types of banknotes as candidate types of banknote (a case of four types is exemplified below), by using features, then performs a detailed judgment using the reference image data for the selected candidates of the type of banknote to specify one type of banknote, and outputs the specified type of banknote as a banknote recognition result.

Figure 2:
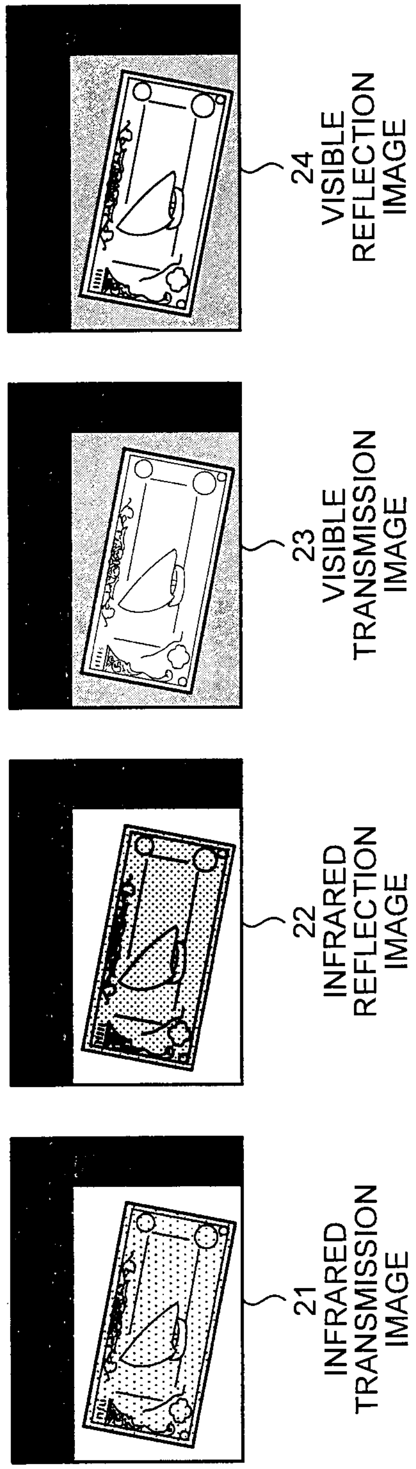
FIG. 2 is an example of an infrared transmission image, an infrared reflection image, a visible transmission image, and a visible reflection image input by an image input unit shown in FIG. 1.

As shown in FIG. 1, the banknote recognition apparatus 10 includes an image input unit 11, a clipping processor 12, a storage unit 13, a candidate narrowing-down processor 14, and a detailed judgment processor 15. The image input unit 11 is a line sensor that retrieves an image of a banknote. The image input unit 11 retrieves, with one read operation, four kinds of images such as an infrared transmission image 21, an infrared reflection image 22, a visible transmission image 23, and a visible reflection image 24 as shown in FIG. 2, and transfers each of the retrieved images to the clipping processor 12.

Specifically, the image input unit 11 irradiates a banknote, as a reading target, with infrared light and visible light to generate the infrared transmission image 21 from a light reception result of infrared light having transmitted through the banknote, generate the infrared reflection image 22 from a light reception result of infrared light reflected from the banknote, generate the visible transmission image 23 from a light reception result of visible light having transmitted through the banknote, and generate the visible reflection image 24 from a light reception result of visible light reflected from the banknote.

The clipping processor 12 clips a banknote portion from the received four kinds of images (the infrared transmission image 21, the infrared reflection image 22, the visible transmission image 23, and the visible reflection image 24) from the image input unit 11. Specifically, the clipping processor 12 obtains width, height, and angle of a banknote portion by using the infrared transmission image 21, and performs a rotating process and a clipping process of each image by using the obtained width, height, and inclination.

The storage unit 13 stores, for each type of banknote, features (an eigenvector and a mean vector) 13_a_, reference image data (an average reference image and a division method) 13_b_, and a weighting factor (λab) 13_c_ of each banknote, as comparing targets with the input image. The storage unit 13 naturally stores therein the features 13_a_ and the reference image data 13_b_ for each type of banknote, but further, for four kinds of images of the same type, which are infrared transmission image, infrared reflection image, visible transmission image, and visible reflection image, respectively.

The features (an eigenvector and a mean vector) 13_a_ of the reference image for each type of banknote stored in the storage unit 13 is used at the time of narrowing down the type of banknote by the candidate narrowing-down processor 14. While detailed explanations thereof will be given later, regarding the features (an eigenvector and a mean vector) 13_a_, a plurality of reference images (for example, 1000 images) are uniformly divided into blocks respectively as for the input image, and a density feature and direction features for each block are obtained to obtain the eigenvector and the mean vector from a distribution thereof.

The reference image data (an average reference image and a dividing procedure) 13_b_ for each type of banknote to be stored in the storage unit 13 is used at the time of performing a detailed judgment by the detailed judgment processor 15. Detailed explanations thereof will be given later. The division method referred to herein is a system for dividing a reference image depending on a size of a banknote or a feature part thereof. The division method specifies such that a characteristic area of a certain banknote is finely divided and a non-characteristic area is roughly divided. The average reference image is acquired by taking an average of pixels of a plurality of reference images for each type of banknote and dividing it into blocks according to the division method mentioned above.

The candidate narrowing-down processor 14 is a unit that selects four candidate types of the banknote (hereinafter, "candidate banknote type") corresponding to the input image upon reception of the input image to be recognized. Specifically, the candidate narrowing-down processor 14 uniformly divides the input images (the infrared transmission image 21, the infrared reflection image 22, the visible transmission image 23, and the visible reflection image 24) into blocks, regardless of the size of the banknote, and selects four candidate banknote types based on the density feature and direction features of each block.

As described above, the candidate narrowing-down processor 14 does not directly and uniquely specify the type of banknote corresponding to the input image as in the conventional art, but selects four candidate banknote types as preprocessing thereof. The detailed judgment processor 15 described later finally judges one type of banknote from the four candidate banknote types.

The reason why the preprocessing is performed is that if the type of banknote is judged directly and uniquely as in the conventional art, when it is determined that a banknote to be recognized does not match a banknote acquired as a determination result in the judgment thereafter, the above-described processing needs to be repeated again by excluding the type of banknote, and a certain time is required for acquiring the correct recognition result.

In the present embodiment, a case that four candidate banknote types are selected is explained; however, the number of candidate types of the banknote to be selected by a selecting process can be changed by command input from an operation unit within the apparatus or from outside of the apparatus. Accordingly, when there are many similar patterns between the types of banknotes, or when it is desired to prevent an omission of candidate, even if sacrificing the processing time, the number of candidate types of the banknote to be selected is increased, or when higher speed processing is desired, the number of candidate types of the banknote is reduced, thereby enabling to perform processing according to the needs of the operator.

The detailed judgment processor 15 performs a detailed judgment to specify one type of banknote corresponding to the input image from the four candidate types of the banknote selected by the candidate narrowing-down processor 14. Specifically, the detailed judgment processor 15 reads pieces of the reference image data 13_b_ corresponding to the respective candidate banknote types from the storage unit 13, and divides the input image into blocks according to the corresponding division method included in the reference image data 13_b_. Then, the detailed judgment processor 15 calculates detailed matching values between the blocks of the input image divided into blocks and the corresponding blocks of the average reference image, and specifies an average reference image corresponding to the input image based on the calculated detailed matching values, to output the type of banknote corresponding to the specified average reference image.

The configuration of the banknote recognition apparatus 10 is explained below with reference to the functional block diagram. However, when the banknote recognition apparatus 10 is actually realized by using a computer, a line sensor corresponding to the image input unit 11 and a hard disk drive corresponding to the storage unit 13 are provided, and programs corresponding to the clipping processor 12, the candidate narrowing-down processor 14, and the detailed judgment processor 15 are stored in a nonvolatile memory or the like so that the programs are loaded to a CPU and executed.

<Details of Clipping Processor>

Figure 3:
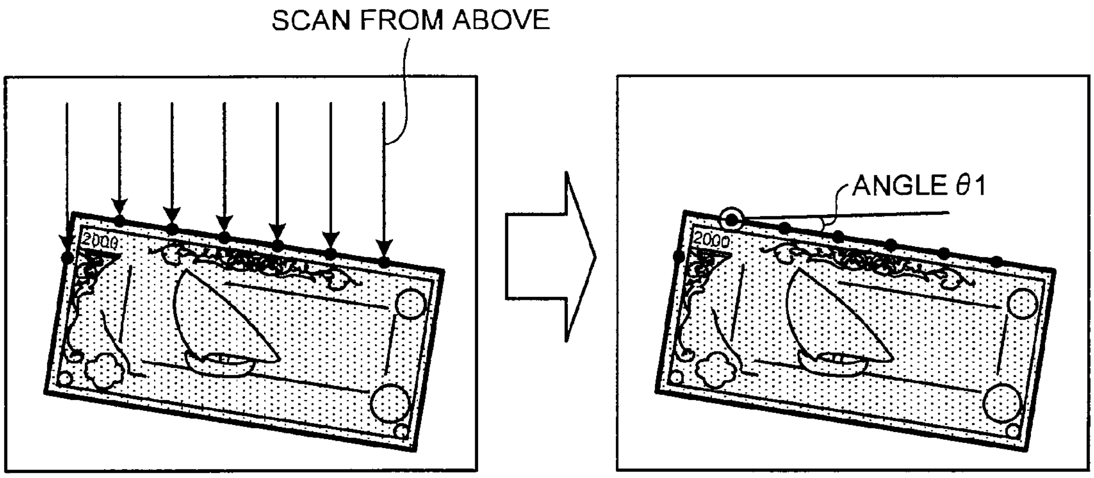
FIG. 3 is an explanatory diagram for explaining an extracting process of an edge point performed by a clipping processor shown in FIG. 1.

Details of the clipping processor 12 shown in FIG. 1 are specifically explained next with reference to FIGS. 3 to 5. FIG. 3 is an explanatory diagram for explaining an extracting process of an edge point performed by the clipping processor 12, FIG. 4 is an explanatory diagram for explaining an angle calculation of a banknote portion using the Hough transform by the clipping processor 12, and FIG. 5 is an explanatory diagram for explaining a clipping process of a banknote portion by the clipping processor 12.

As shown in FIG. 3, the clipping processor 12 scans the infrared transmission image 21 of the input image from above, to detect a pixel having a pixel value larger than a predetermined threshold as the edge point. The clipping processor 12 performs the same processing from below, from left, and from right, to detect the edge point, and obtains an approximate angle θ1 of an edge portion of a banknote from these edge points.

Figure 4:
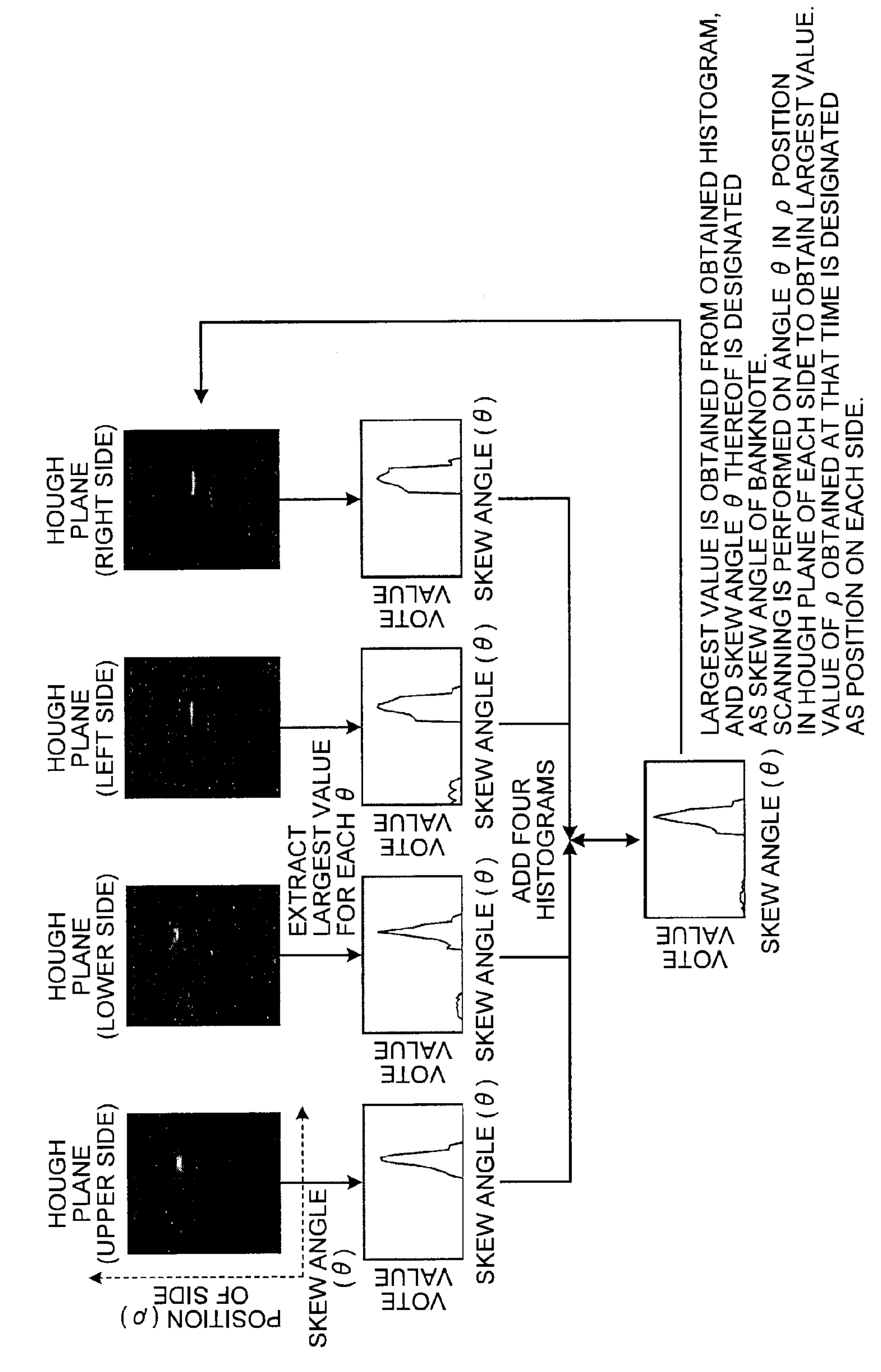
FIG. 4 is an explanatory diagram for explaining an angle calculation of a banknote portion using the Hough transform by the clipping processor shown in FIG. 1.

Thereafter, as shown in FIG. 4, the clipping processor 12 performs the Hough transform based on the detected edge points and the angle θ1 thereof to obtain Hough planes of the upper side, lower side, left side, and right side, and votes an angle θ for each Hough plane to create four histograms (votes the inclination by rotating the left and right sides by 90 degrees for the left and right sides). Then, the clipping processor 12 adds the four histograms to obtain the angle θ at which a vote value of the added histogram is maximum, and designates the obtained angle θ as the skew angle of the banknote. Thereafter, the clipping processor 12 obtains a position ρ corresponding to the angle θ on each of the Hough planes of the upper side, lower side, left side, and right side, and performs processing for designating the value of ρ as a position of each side.

Figure 5:
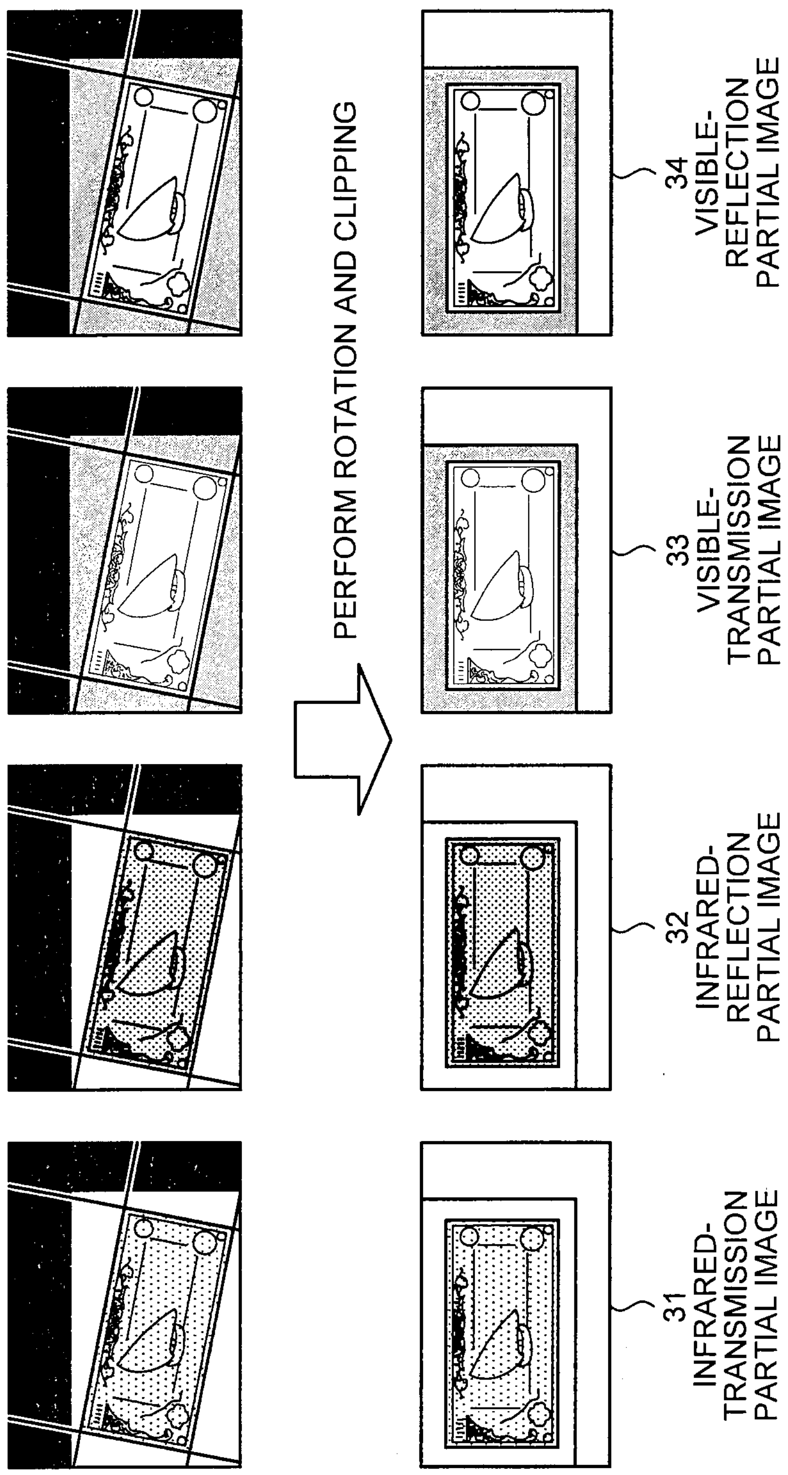
FIG. 5 is an explanatory diagram for explaining a clipping process of a banknote portion by the clipping processor shown in FIG. 1.

Thereafter, as shown in FIG. 5, the clipping processor 12 clips a banknote portion from the input image and rotates the banknote portion based on the obtained position (ρ) and the skew angle (θ) of each side to acquire a partial image. When the skew angle θ of the banknote and the position ρ of each side are detected by using the infrared transmission image 21, the clipping processor 12 clips the banknote portion from the infrared transmission image 21, the infrared reflection image 22, the visible transmission image 23, and the visible reflection image 24 by using the same value, to acquire an infrared-transmission partial image 31, an infrared-reflection partial image 32, a visible-transmission partial image 33, and a visible-reflection partial image 34 shown in FIG. 5.

In this manner, the clipping processor 12 clips the partial image (the infrared-transmission partial image 31, the infrared-reflection partial image 32, the visible-transmission partial image 33, and the visible-reflection partial image 34) of a banknote portion from the received input image (the infrared transmission image 21, the infrared reflection image 22, the visible transmission image 23, and the visible reflection image 24) from the image input unit 11.

<Details of Candidate Narrowing-Down Processor>

Figure 6:
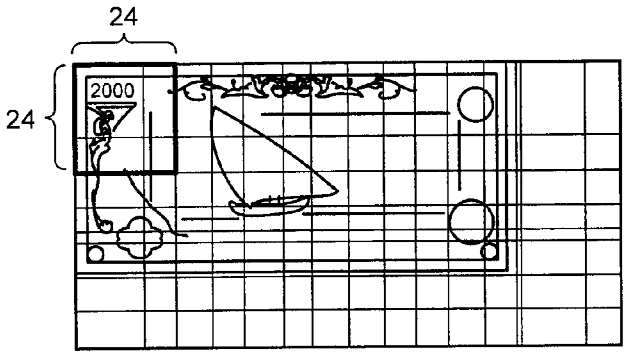
FIG. 6 is an explanatory diagram for explaining a block division by a candidate narrowing-down processor shown in FIG. 1.
Figure 7:
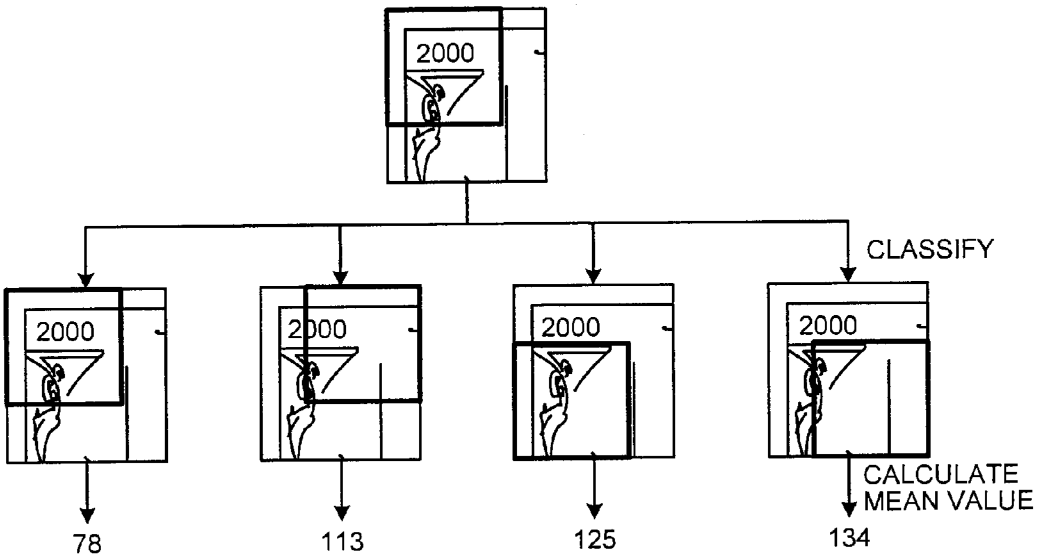
FIG. 7 is an explanatory diagram for explaining a density feature calculated by the candidate narrowing-down processor shown in FIG. 1.
Figure 8:
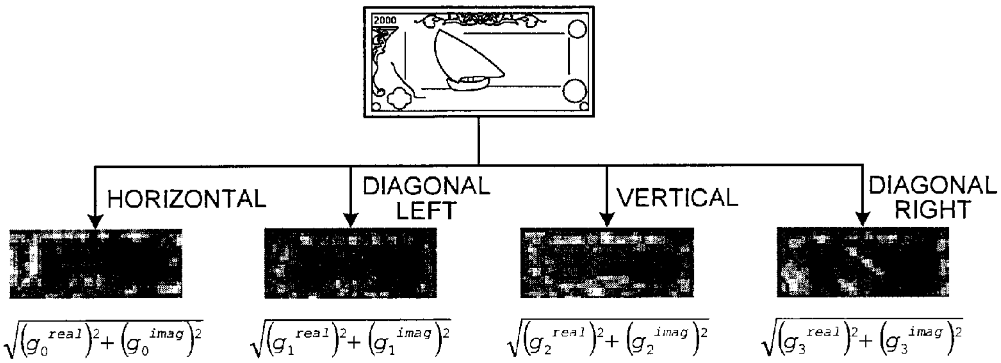
FIG. 8 is an explanatory diagram for explaining a direction feature calculated by the candidate narrowing-down processor shown in FIG. 1.

Details of the candidate narrowing-down processor 14 shown in FIG. 1 are specifically explained next with reference to FIGS. 6 to 8. FIG. 6 is an explanatory diagram for explaining a block division by the candidate narrowing-down processor 14, FIG. 7 is an explanatory diagram for explaining a density feature calculated by the candidate narrowing-down processor 14, and FIG. 8 is an explanatory diagram for explaining direction features calculated by the candidate narrowing-down processor 14.

As shown FIG. 1, the candidate narrowing-down processor 14 includes a block division processor 14*a*, a density-feature extracting unit 14*b*, a direction-feature extracting unit 14*c*, a matching value calculator 14*d*, and a candidate selecting unit 14*e*.

The block division processor 14*a* uniformly divides the input image into blocks regardless of the size of a banknote and a characteristic portion thereof, and in the present embodiment, as shown in FIG. 6, divides the input image into blocks having a size of 24×24 pixels. The block division processor 14*a* acquires the next block with 16 pixels being shifted after acquisition of one block, so that the adjacent blocks overlap on each other by eight pixels. Thus, the block division processor 14*a* divides the input image into blocks having the size of 24×24 pixels, so that a distance between centers of adjacent blocks is 16 pixels and the adjacent blocks overlap on each other by eight pixels.

The reason why a uniform block division is performed (the block size is fixed) regardless of the size of a banknote or a characteristic portion thereof is that execution of an adaptive process requiring a certain time at a stage when a narrowing-down process is performed, inversely causes a processing delay. Further, it is considered that if a judgment taking the size of a banknote and a characteristic portion thereof into consideration is performed in the detailed judgment performed later by the detailed judgment processor 15, there is less necessity of performing a adaptive division in the narrowing-down process.

The density-feature extracting unit 14*b* further divides each block divided by the block division processor 14*a* into four, to obtain a mean value in each divided area, and designate the mean value as the density feature. For example, because the mean value in an upper left portion in FIG. 7 is 78, the mean value in an upper right portion is 113, the mean value in a lower left portion is 125, and the mean value in a lower right portion is 134, the density features in this case are (78, 113, 125, 134).

The direction-feature extracting unit 14*c* applies a Gabor filter (four directions of horizontal, vertical, diagonal right, and diagonal left) to each block divided by the block division processor 14*a*, to obtain direction features in each pixel. The Gabor filter is applied to each block; however, a case that the Gabor filter is applied to the entire banknote is shown in FIG. 8 for the convenience of explanation.

Thus obtained direction features of the respective pixels are normalized. For example, when the obtained direction features are (0.7, 0.2, 0.1, 1.2), (0.32. 0.09, 0.05, 0.55) obtained by dividing each component by a total value of each component, that is, 0.7+0.2+0.1+1.2=2.2 are normalized direction features.

That is, when it is assumed that each pixel value in a direction image of the block in which the Gabor filter is applied to each block is:

$$\sqrt{(g_k^{real})^2+(g_k^{imag})^2}$$

(where k=0 indicates horizontal, k=1 indicates diagonal left, k=2 indicates vertical, and k=3 indicates diagonal right), a normalized direction features $g_k'$ of each pixel can be obtained according to the following equation.

$$g_k' = \frac{\sqrt{(g_k^{real})^2 + (g_k^{imag})^2}}{\sum_{i=0}^{3} \sqrt{(g_i^{real})^2 + (g_i^{imag})^2}}$$

The mean value of the direction features $g_k'$ (four dimensional) of each pixel are obtained in a unit of block and designated as the direction features of each block. Accordingly, the number of dimensions of the direction features per image are up to 32×4×4=512, because the number of blocks is 32, each block is four dimensional, and there are four kinds of input images (the infrared transmission image 21, the infrared reflection image 22, the visible transmission image 23, and the visible reflection image 24).

The matching value calculator 14*d* calculates a matching value between the input image and (reference images of) each banknote by using the density feature obtained by the density-feature extracting unit 14*b* and the direction features obtained by the direction-feature extracting unit 14*c*.

Specifically, the matching value calculator 14*d* performs a process for obtaining the density features and the direction features 1000 times for each type of banknote (ten trials for 100 banknotes), and obtains a mean vector $M_i$ thereof and an eigenvector of a covariance matrix $K_i$ to store these vectors in the storage unit 13 as a feature. When the input image is acquired, the matching value calculator 14*d* obtains the density features and the direction features by performing the above process with respect to the input image, and designates the density features and the direction features value added by a projection distance of the feature of the input image to the eigenvector as a matching value.

Figure 9:
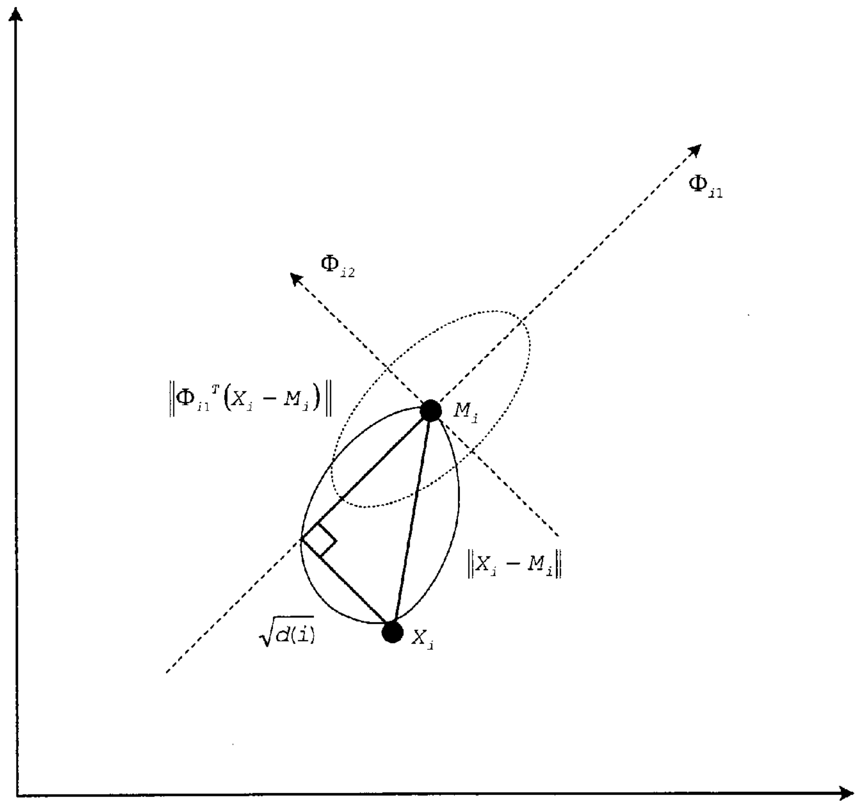
FIG. 9 is an explanatory diagram for explaining a concept of a matching value calculated by the candidate narrowing-down processor.

FIG. 9 is an explanatory diagram for explaining a concept of a matching value calculated by the candidate narrowing-down processor 14. A case of two-dimensional mode is explained here for the convenience of explanation. When 1000 trials are performed beforehand for a certain type of banknote, because there is a difference in obtained density features and direction features, the mean vector Mi and the eigenvector of the covariance matrix $K_i=\Sigma(X_i-M_i)(X_i-M_i)^T$ can be obtained.

That is, the 1000 trials are elliptically distributed, centering on the mean vector Mi shown in FIG. 9 with a primary axis $\Phi_{i1}$ and a secondary axis $\Phi_{i2}$. When the input image is read to obtain a feature $X_i$ (density features and direction features), the distance between the mean vector Mi and the feature $X_i$ is $\|X_i-M_i\|$ ($\|a\|$ indicates Euclidean norm of a).

Because a distance from a point at which the feature $X_i$ of the input image is projected on the primary axis $\Phi_{i1}$ to the mean vector $M_i$ is $\|\Phi_{i1}{}^T(X_i-M_i)\|$, a projection distance d(i) from the feature $X_i$ to the primary axis $\Phi_{i1}$ can be obtained according to the following equation. Because a case that five axis are selected from a longer side of the primary axis is assumed here, k=1 to 5.

$$d(i)=\|X_i-M_i\|^2-\sum_{k=1}^{5}\{\Phi_{ik}^T(X_i-M_i)\}^2$$

Where i=1 indicates density feature in 128 dimensions of the infrared transmission image, i=2 indicates density feature in 128 dimensions of the infrared reflection image, i=3 indicates density feature in 128 dimensions of the visible transmission image, i=4 indicates density feature in 128 dimensions of the visible reflection image, i=5 indicates density feature in 128 dimensions of the infrared transmission image, i=6 indicates density feature in 128 dimensions of the infrared reflection image, i=7 indicates density feature in 128 dimensions of the visible transmission image, and i=8 indicates density feature in 128 dimensions of the visible reflection image.

A matching value Z to be obtained is a total of these values, that is, Z=Σd(i) (where i=1 to 8 and i is explained above). To reduce the processing time, the matching value Z is not obtained for all the reference images, but a candidate is narrowed down with a projection distance value thereof, every time a projection distance d(i) is obtained. For example, a narrowing-down process is performed such that the candidates are narrowed down to 128 by d(4), and then narrowed down to 32 by d(2). Accordingly, the number of candidate types of banknote can be narrowed down to, for example, about six to eight candidates, and a matching value of each type of banknote can be acquired together. It is preferable to perform a calculation of d(4) first, because d(4) indicating the density feature of the visible reflection image has the largest features in separating the type.

Accordingly, in the present embodiment, a series of processes described above is performed beforehand for each type of banknote to obtain, for example, 1000 patterns of a density feature and direction features and to obtain the features (a mean vector and an eigenvector) 13*a* thereof, and results thereof need to be stored in the storage unit 13. A calculation of the features (a mean vector and an eigenvector) does not need to be performed in the banknote recognition apparatus 10, and data acquired by a separate device needs only to be stored in the storage unit 13.

The candidate selecting unit 14*e* selects a predetermined number (four, in this case) of candidate banknote types having a larger matching value from the types of banknote narrowed down by the matching value calculator 14*d*. For example, when matching values of six candidates are obtained by the matching value calculator 14*d*, the candidate selecting unit 14*e* selects four candidates having a higher matching value from the six candidates. As explained above, the number of candidates to be selected can be changed by a command input from an operation unit within the apparatus or from outside of the apparatus.

<Details of Detailed Judgment Processor>

Figure 10:
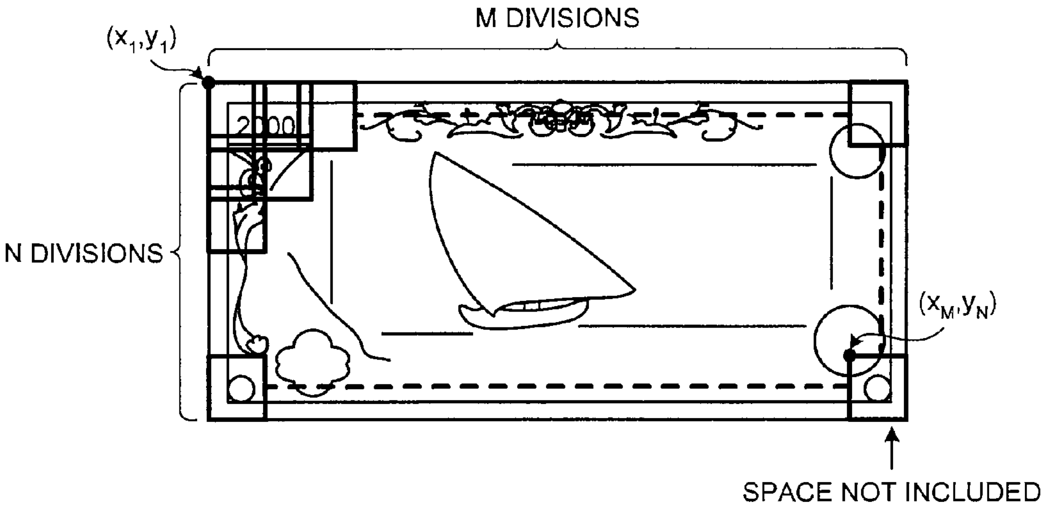
FIG. 10 is an explanatory diagram for explaining a block division by a detailed judgment processor shown in FIG. 1.
Figure 11:
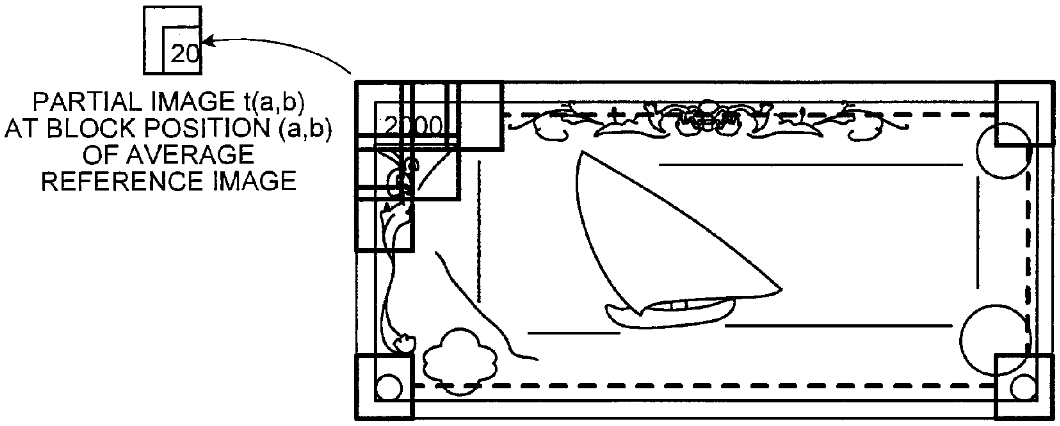
FIG. 11 is an explanatory diagram for explaining extraction of a partial image t(a,b) at a block position (a,b) of an average reference image.
Figure 12:
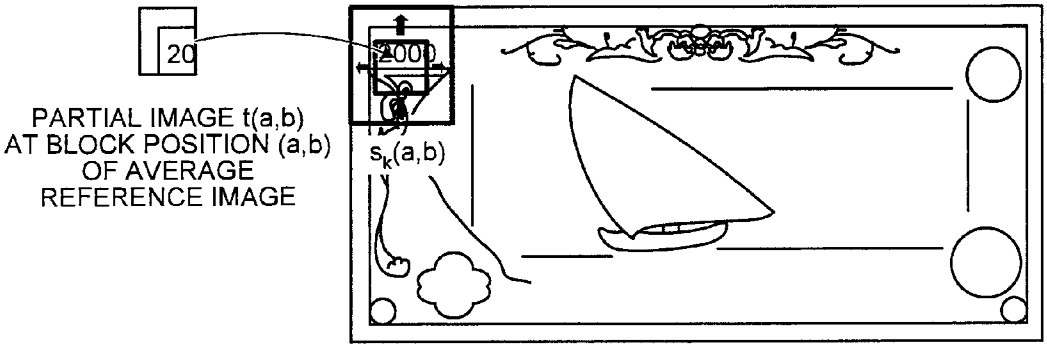
FIG. 12 is an explanatory diagram for explaining a concept of calculating a matching value (a density difference) by shifting around a block position of a corresponding input image a partial image at a certain block of an average reference image.

Details of the detailed judgment processor 15 shown in FIG. 1 are explained next with reference to FIGS. 10 to 12. FIG. 10 is an explanatory diagram for explaining a block division by the detailed judgment processor 15, FIG. 11 is an explanatory diagram for explaining generation of an average reference image by the detailed judgment processor 15, and FIG. 12 is an explanatory diagram for explaining a calculation of a matching value by the detailed judgment processor 15.

As shown in FIG. 1, the detailed judgment processor 15 includes a block division processor 15*a*, a detailed matching-value calculator 15*b*, and a recognition-result output unit 15*c*. The block division processor 15*a* reads the division methods included in the reference image data 13*b* corresponding to each of the four candidate banknote types selected by the candidate narrowing-down processor 14 from the storage unit 13, and divides the input image into blocks according to each of the read division methods.

The block division processor 15*a* divides the input image not by a uniform block division performed by the block division processor 14*a* in the candidate narrowing-down processor 14, but by changing the block position and the number of blocks for each type of banknote. It is because the block division is performed so that a part having characteristics of each banknote is highlighted. It is desired that the number of blocks increases than the case of the block division processor 14*a* and adjustment is performed not to include a space with equal intervals. In FIG. 10, there is shown a state that, when M blocks are provided in a horizontal direction and N blocks are provided in a vertical direction, adjustment is performed so as not to include an outer area other than a banknote portion in a far left block. Thus, it is important to calculate a significant matching value by performing adjustment not to include a space other than a banknote portion.

How to obtain the block position is specifically explained. First, when it is assumed that banknote lengths in the horizontal and vertical directions of a banknote are lenX and lenY, respectively, the number of blocks in the horizontal and vertical directions of the banknote are M and N, respectively, block intervals in the horizontal and vertical directions of banknotes are disX and disY, respectively, and a block position to be obtained is (Xa, Yb), the number of blocks in the horizontal and vertical directions are counted at 8-pixel intervals with respect to the banknote length. When it is assumed that the block size is 12×12 pixels, $$M=((\mathrm{len}X-12)/8)+1$$

$$N=((\mathrm{len}Y-12)/8)+1$$

are established.

Block intervals (equal to or less than eight pixels) are obtained using the number of blocks M and N according to the following equations, $$\mathrm{dis}X=(\mathrm{len}X-12)/M$$

$$\mathrm{dis}Y=(\mathrm{len}Y-12)/N$$

and a block position, which is a-th block in the horizontal direction and b-th block in the vertical direction, is obtained by using the obtained block intervals disX and disY according to the following calculation formulas.

$$Xa = disX \times a$$

$$Yb = disY \times b$$

The detailed matching-value calculator 15*b* calculates density differences between the blocks of the input image and the corresponding blocks of the average reference image as detailed matching values. Specifically, when a block clipping position (a,b) of a certain block of the input image is determined, the detailed matching-value calculator 15*b* clips 49 blocks by shifting the clipping position by three pixels in the horizontal direction and three pixels in the vertical directions (a±3, b±3). The detailed matching-value calculator 15*b* then obtains density differences between the clipped 49 blocks of the input image and blocks clipped based on the corresponding block position (a,b) of the average reference image. The detailed matching-value calculator 15*b* obtains a minimum value from the 49 density differences and designates the minimum value as a matching value of the block. A case that the clipping position is shifted by three pixels in the horizontal direction and three pixels in the vertical direction is explained here; however, the shift amount is not limited thereto.

The reason why not only one density difference between blocks at the respective block clipping positions (a,b) of the input image and the average reference image is calculated, but the density differences between the 49 blocks of the input image and the corresponding 49 blocks of the average reference image are obtained by shifting the block clipping position is that misregistration may have occurred in the input image.

This feature is explained in more detail. When the block position (a,b) of the input image is determined, and when it is assumed that k pieces (for example, 49 pieces) of image data centering on the block position are indicated as $s_k(a,b)$ ($1 \leqq k \leqq 49$) and the image data of the average reference image at the block position (a,b) is t(a,b), a matching value $Z_{a,b}$ in each blocks is obtained by the following equation. The equation obtains the density difference, and the minimum value of the 49 density differences with k=1 to 49 is designated as a matching value at the block position. When it is assumed that $s_{ki}(a,b)$ denotes the i-th pixel value in a certain block image of the input image, $t_i(a,b)$ denotes the i-th pixel value in a certain block image of an average reference value, n denotes the number of pixels in the block image, and $Z_{a,b}$ denotes a matching value at the block position, the following equation is established.

$$z_{a,b} = \min_k \left[ \sum_{i=1}^{n} |s_{ki}(a, b) - t_i(a, b)| \right]$$

In practice, as shown in FIG. 11, after a partial image at the block position (a,b) of the average reference image is clipped, as shown in FIG. 12, the partial image clipped from the average reference image is applied to the same block position (a,b) of the input image, thereby obtaining a density difference. Thereafter, the applied position is sequentially shifted by ±3 pixels in the horizontal direction and ±3 pixels in the vertical direction to obtain density differences, and the minimum value thereof is designated as a matching value at the block position (a,b).

In this manner, after the matching values of all blocks are obtained, the matching values of all blocks are added as shown in the following equation to obtain a detailed matching value Z with a specific type of candidate banknote, where $\lambda_{a,b}$ is a parameter read from the storage unit 13 and is a weighting factor of each block. The weighting factor $\lambda_{a,b}$ is increased for a characteristic block of the type of banknote, and reduced for a non-characteristic block of the type of banknote. For example, a linear discriminant analysis is performed by using data acquired from a plurality of genuine notes and other kinds of banknote (foreign banknotes, other denominations), and the weighting factor $\lambda_{a,b}$ can be set based on a result thereof.

$$z = \sum_{b=1}^{N} \sum_{a=1}^{M} \lambda_{a,b} \cdot Z_{a,b}$$

After the detailed matching-value calculator 15*b* obtains detailed matching values for all candidate banknote types, the recognition-result output unit 15*c* outputs the type of banknote having the largest detailed matching value as a banknote recognition result. For example, a banknote recognition result can be displayed on a display unit (not shown) or can be printed by a printing unit (not shown).

<Banknote-Recognition Process Procedure Performed by Banknote Recognition Apparatus>

Figure 13:
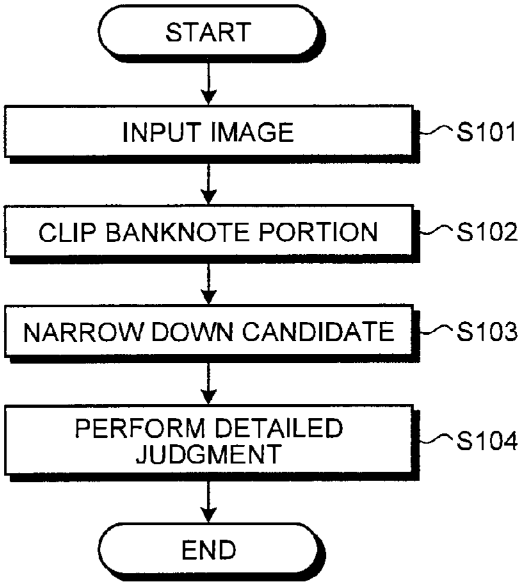
FIG. 13 is a flowchart for explaining a banknote-recognition process procedure performed by the banknote recognition apparatus shown in FIG. 1.

A banknote-recognition process procedure performed by the banknote recognition apparatus 10 shown in FIG. 1 is explained next. FIG. 13 is a flowchart of the banknote recognition-process procedure performed by the banknote recognition apparatus 10. It is assumed that the features (a mean vector and an eigenvector) 13*a* for each type of banknote are stored beforehand in the storage unit 13.

As shown in FIG. 13, in the banknote recognition apparatus 10, the image input unit 11 performs an image inputting process for retrieving an input image of a banknote to be recognized (Step S101). The input image includes the infrared transmission image 21, the infrared reflection image 22, the visible transmission image 23, and the visible reflection image 24 shown in FIG. 2.

The clipping processor 12 then performs a clipping process for clipping a banknote portion respectively from the received input images (four kinds of images) from the image input unit 11 (Step S102), and the candidate narrowing-down processor 14 selects four candidate banknote types corresponding to the input image (Step S103).

The detailed judgment processor 15 then performs a detailed judgment to specify one type of banknote corresponding to the input image from the four candidate banknote types selected by the candidate narrowing-down processor 14 (Step S104). Thus, one type of banknote corresponding to the input image is output by the detailed judgment.

Figure 14:
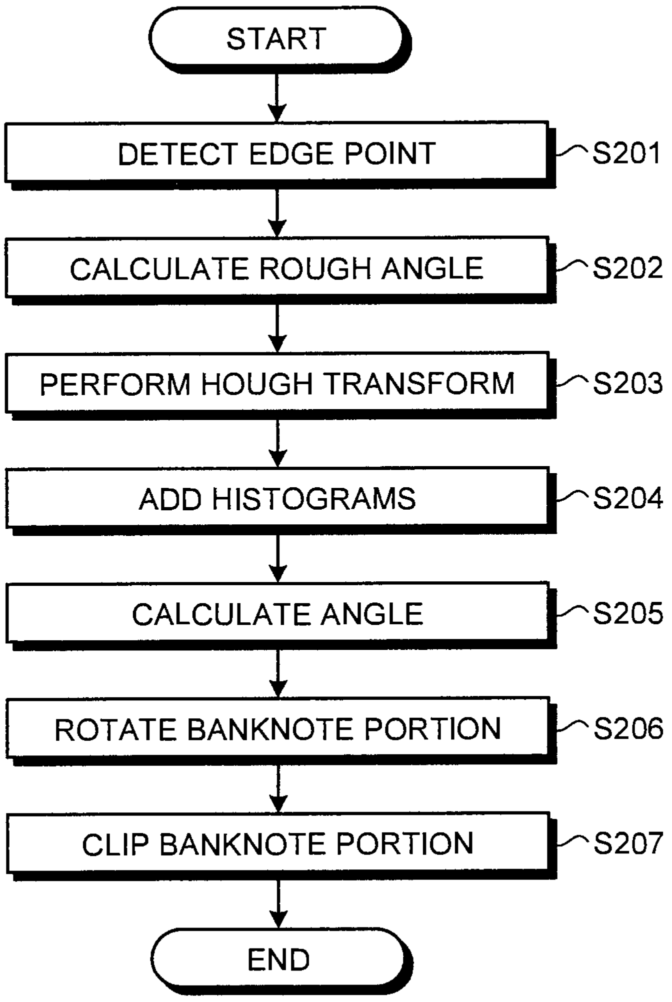
FIG. 14 is a flowchart of a clipping process procedure of a banknote portion shown at Step S102 in FIG. 13.

Next, a clipping process procedure of a banknote portion shown at Step S102 is explained below in more detail. FIG. 14 is a flowchart of the clipping process procedure of a banknote portion shown at Step S102 in FIG. 13.

As shown in FIG. 14, in a clipping process of a banknote portion, edge point detection is performed for detecting an edge point on an outer rim of a banknote portion in the four kinds of input images, that is, the infrared transmission image 21, the infrared reflection image 22, the visible transmission image 23, and the visible reflection image 24 (Step S201), and the rough skew angle θ1, which indicates an inclination of the banknote portion, is obtained by using the detected edge point (Step S202). Specifically, scanning is performed from above, as shown in FIG. 3, and a process of detecting an edge point having a pixel value larger than a predetermined value is repeated horizontally and vertically to obtain an edge point, and then the angle θ1 shown in FIG. 3 is acquired.

As explained above with reference to FIG. 4, the Hough transform is then performed based on the edge point and the angle θ1 to obtain the Hough planes on the upper side, lower side, left side, and right side (Step S203), and the largest value is obtained for each angle within a vote plane on each side to perform histogram addition for adding the largest values of the four sides (Step S204). An angle with the obtained largest value of the histogram is designated as the skew angle θ of a banknote, to obtain the largest value at the skew angle θ from the Hough plane in each side, and an angle calculation is performed, designating the largest value as the position ρ on each side (Step S205).

As shown in FIG. 5, a banknote portion is then clipped based on the obtained position ρ and the skew angle θ on each side and rotated (Step S206), and the clipping process of the banknote portion is performed for clipping the banknote portion from the input image (Step S207).

Figure 15:
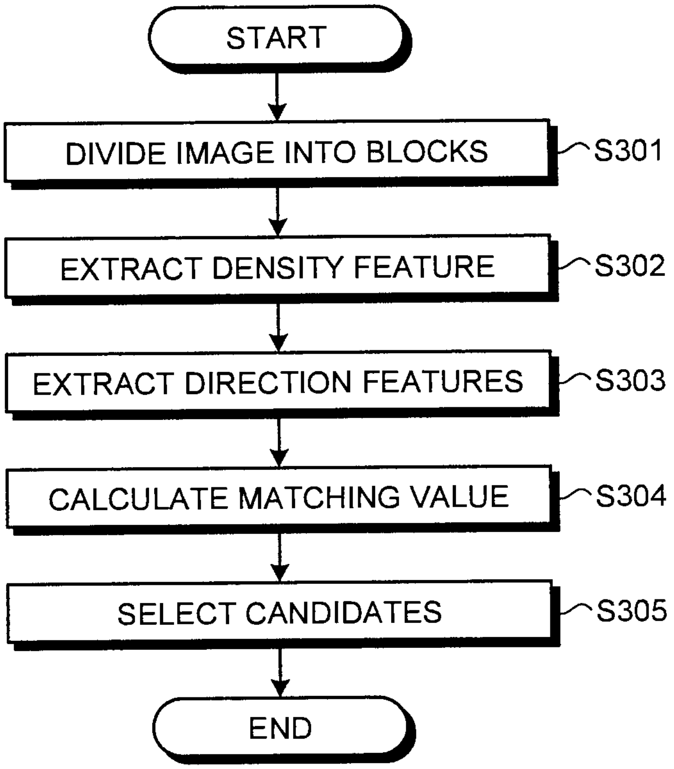
FIG. 15 is a flowchart of a candidate-narrowing-down process procedure shown at Step S103 in FIG. 13.

A candidate-narrowing-down process procedure shown at Step S103 in FIG. 13 is explained next in detail. FIG. 15 is a flowchart of the candidate-narrowing-down process procedure shown at Step S103 in FIG. 13.

As shown in FIG. 15, a block division is performed first for uniformly dividing the input image into blocks (Step S301). Specifically, as shown in FIG. 6, a block having a size of 24×24 pixels is divided into blocks with intervals of 16×16 pixels.

Thereafter, a density-feature extracting process in which each block divided by the block division processor 14*a* is further divided into four parts to obtain mean values thereof and the mean values is designated as the density feature (Step S302) is performed, and the Gabor filter (four directions of horizontal, vertical, diagonal left, and diagonal right) is applied to each block of the input image, thereby obtaining the direction features in each pixel (Step S303).

Thereafter, the matching value calculator 14*d* calculates a matching value for each type of banknote of the input image by using the density feature obtained by the density-feature extracting unit 14*b* and the direction features obtained by the direction-feature extracting unit 14*c* (Step S304), and the candidate selecting unit 14*e* selects four candidates in a descending order of the matching value (Step S305).

Figure 16:
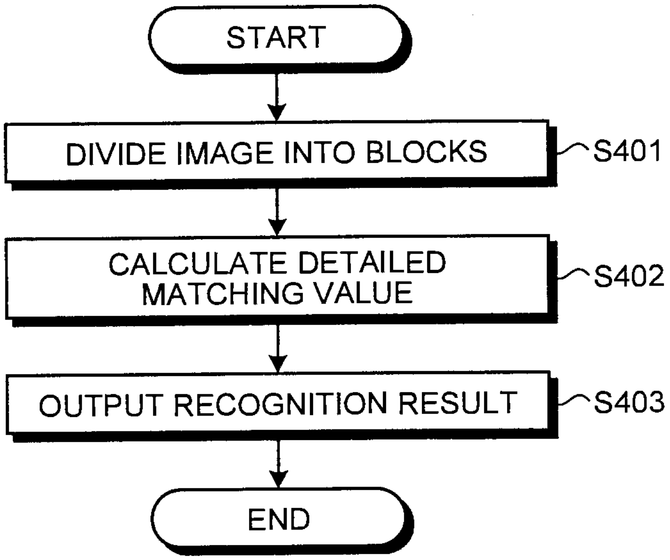
FIG. 16 is a flowchart of a detailed-judgment process procedure shown at Step S104 in FIG. 13.

A detailed-judgment process procedure shown at Step S104 in FIG. 13 is explained next in detail. FIG. 16 is a flowchart of the detailed-judgment process procedure shown at Step S104 in FIG. 13.

As shown in FIG. 16, the block division processor 15*a* adaptively divides the input image into blocks according to each of the division methods corresponding to the four candidate banknote types selected by the candidate narrowing-down processor 14 (Step S401). That is, the block division processor 15*a* performs not the uniform block division performed by the block division processor 14*a* in the candidate narrowing-down processor 14, but performs a dividing process by changing the block position and the number of blocks for each type of banknote.

Thereafter, the detailed matching-value calculator 15*b* obtains density differences between the blocks of the input image and the corresponding blocks of the average reference image, and adds up the density differences (matching values) of all the blocks, thereby calculating a detailed matching value (Step S402).

When the detailed matching value is obtained for each candidate banknote type, the recognition-result output unit 15*c* outputs the candidate banknote type having the largest detailed matching value as a banknote recognition result (Step S403).

As described above, in the present embodiment, an image inputting process of retrieving an image of a banknote to be recognized as an input image is performed by the image input unit 11, and the clipping processor 12 respectively clips a banknote portion from received input images (four kinds of images) from the image input unit 11. The candidate narrowing-down processor 14 selects four reference images corresponding to the input image, and the detailed judgment processor 15 performs a detailed judgment to specify one candidate reference image corresponding to the input image from the four candidate reference images selected by the candidate narrowing-down processor 14. Therefore, even if there are many types of paper sheets to be judged, the type of paper sheet can be recognized highly accurately and efficiently and at high speed.

In the present embodiment, there has been explained a case that features (an eigenvector and a mean vector) of each reference image used in a candidate narrowing-down process and average reference images used in a detailed judgment are generated beforehand by separate devices and stored in the storage unit 13. However, the present invention is not limited thereto, and these pieces of information can be generated beforehand by the banknote recognition apparatus 10 and stored in the storage unit 13, or these pieces of information can be generated upon reception of an input image.

In the present embodiment, there has been explained that the average reference image 13*b* generated beforehand by the detailed judgment processor 15 is used. However, the present invention is not limited thereto, and a reference image retrieved in an ideal environment can be used instead of the average reference image.

In the present embodiment, a case that the detailed judgment processor 15 performs a detailed judgment by using density differences have been explained. However, the present invention is not limited thereto, and the detailed judgment can be performed by another system.

In the present embodiment, a case that the present invention is applied to a banknote has been explained. However, the present invention is not limited thereto, and the invention can be also applied to a case that other types of paper sheets, such as checks, are to be recognized.

Industrial Applicability

As described above, the paper sheet recognition apparatus and the paper sheet recognition method according to the present invention are useful when an input image of paper sheets is matched with a reference image of a plurality of paper sheets to recognize the type of paper sheet in the input image. Particularly, the paper sheet recognition apparatus and the paper sheet recognition method are suitable for recognizing the type of paper sheet highly accurately and efficiently and at high speed, even when there are many types of paper sheets to be judged.

The invention claimed is:

1. A paper sheet recognition apparatus that recognizes a type of a paper sheet in an input image by matching the input image of the paper sheet with reference images of a plurality of paper sheets, comprising:

a candidate selecting unit that selects a plurality of candidate types of the paper sheet based on a density feature and direction features of each block acquired by uniformly dividing the input image and the reference images; and a detailed judgment unit that adaptively divides the input image into blocks according to features of a reference image corresponding to each of the candidate types of the paper sheet selected by the candidate selecting unit, and performs a detailed judgment based on matching values between corresponding blocks of the divided input image and each of the reference images.

2. The paper sheet recognition apparatus according to claim 1, further comprising a feature storage unit that stores therein the features of the reference image for each of the candidate types of the paper sheet, wherein the candidate selecting unit comprises:

a first block dividing unit that uniformly divides the input image into blocks at a time of receiving the input image;

a density feature calculator that calculates a density feature of each block divided by the first block dividing unit;

a direction feature calculator that calculates direction features of each block divided by the first block dividing unit; and a selecting unit that selects the plurality of candidate types of the paper sheet based on the density feature of each block calculated by the density feature calculator, the direction features of each block calculated by the direction feature calculator, and the features of each of the reference images stored in the feature storage unit.

3. The paper sheet recognition apparatus according to claim 1, further comprising a memory that stores, for each of the candidate types of the paper sheet, block division methods each corresponding to the features of the reference image of each of the candidate types of the paper sheet and divided reference images acquired by dividing the reference image into blocks according to the block division method, wherein the detailed judgment unit comprises:

a second block dividing unit that reads, from the memory, block division methods and divided reference images, which respectively correspond to the candidate types of the paper sheet selected by the candidate selecting unit, and divides the input image into blocks according to each of the block division methods;

a detailed matching-value calculator that calculates, for each of the candidate types of the paper sheet, detailed matching values between corresponding blocks of the divided input image divided into blocks by the second block dividing unit and the divided reference images; and a specifying unit that specifies a type of the paper sheet corresponding to the input image based on respective detailed matching values calculated by the detailed matching-value calculator.

4. The paper sheet recognition apparatus according to claim 1, wherein the input image and the reference images include an infrared reflection image, an infrared transmission image, a visible reflection image, and a visible transmission image acquired by imaging a same paper sheet, and the candidate selecting unit temporarily narrows down the candidate types of the paper sheet by using a density feature and direction features of each block in the visible reflection image, and then sequentially narrows down the candidate types of the paper sheet by using the infrared transmission image, the infrared reflection image, and the visible transmission image of the temporarily narrowed down candidate types of the paper sheet, to select the plurality of candidate types of the paper sheet from a plurality of paper sheet types.

5. The paper sheet recognition apparatus according to claim 2, wherein the first block dividing unit divides the input image uniformly into blocks of a same block size, even if sizes of respective paper sheets are different depending on the candidate types of the paper sheet.

6. The paper sheet recognition apparatus according to claim 2, wherein the candidate selecting unit further comprises a number-of-selections receiving unit that receives a command input for setting a number of candidate types of the paper sheet to be selected, and the candidate selecting unit selects the set number of candidate types of the paper sheet.

7. A paper sheet recognition method for recognizing a type of a paper sheet in an input image by matching the input image of the paper sheet with reference images of a plurality of paper sheets, comprising:

a candidate selecting step of selecting a plurality of candidate types of the paper sheet based on a density feature and direction features of each block acquired by uniformly dividing the input image and the reference images; and a detailed judgment step of adaptively dividing the input image into blocks according to a feature of a reference image corresponding to each of the candidate types of the paper sheet selected at the candidate selecting step, and of performing a detailed judgment based on matching values between corresponding blocks of the divided input image and each of the reference images.

* * * * *